Figure 1:
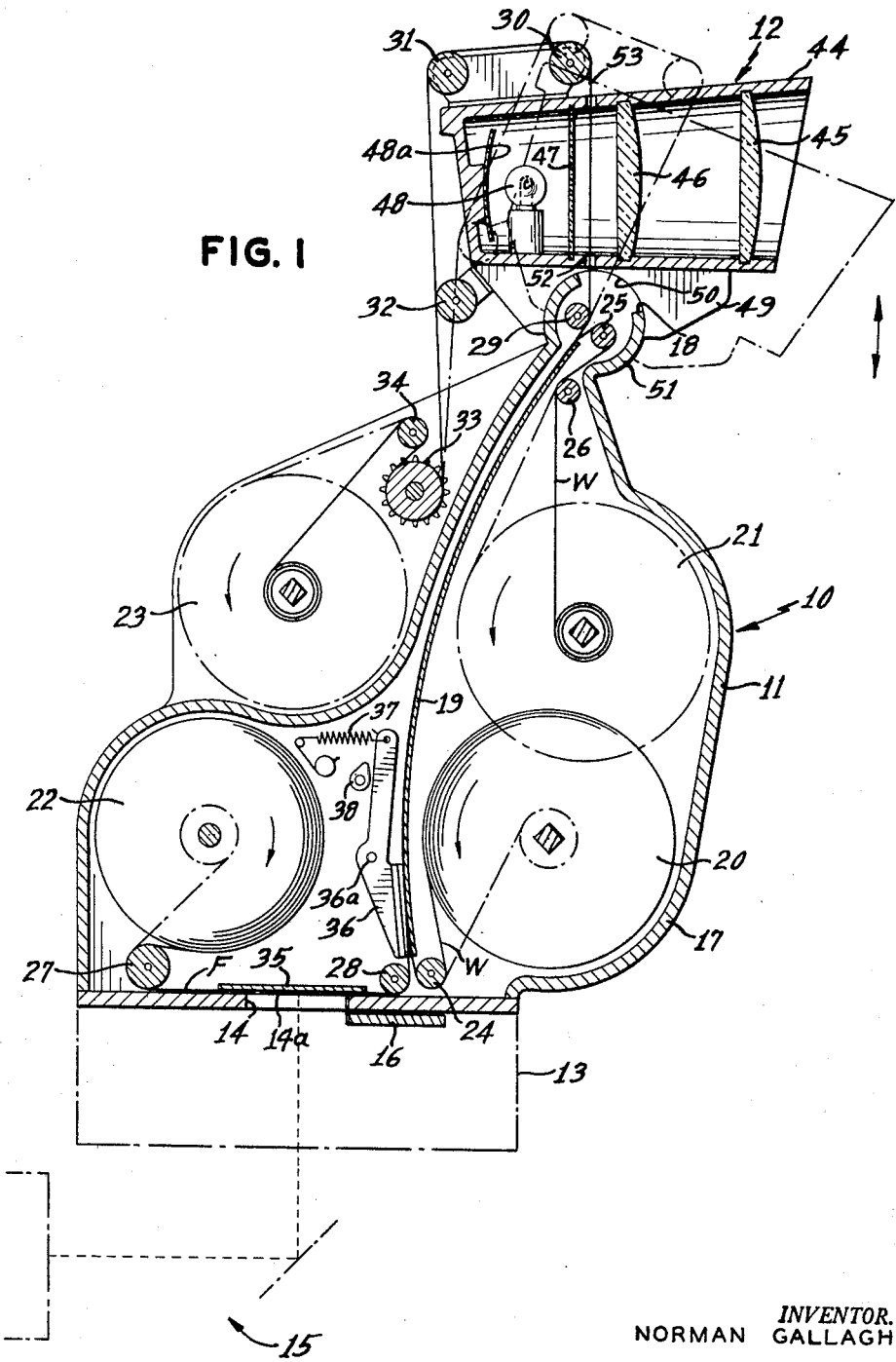

March 1, 1966

N. GALLAGHER 3,237,541

FILM PROCESSOR-VIEWER

Filed Oct. 10, 1963

2 Sheets-Sheet 1

FIG. I

INVENTOR.
NORMAN GALLAGHER

BY *James A. Eisenman*

ATTORNEY

March 1, 1966  N. GALLAGHER  3,237,541
FILM PROCESSOR-VIEWER
Filed Oct. 10, 1963

2 Sheets-Sheet 2

INVENTOR.
NORMAN GALLAGHER
BY James A. Eisenman
ATTORNEY

United States Patent Office 3,237,541
Patented Mar. 1, 1966

3,237,541
FILM PROCESSOR-VIEWER
Norman Gallagher, Northport, N.Y., assignor, by mesne assignments, to Benrus Watch Company, Inc., a corporation of New York
Filed Oct. 10, 1963, Ser. No. 315,208
8 Claims. (Cl. 95—12)

This invention relates to apparatus for processing strip film and more particularly to apparatus for processing strip film together with means to view the film as it is developed and, if desired, means to expose the film prior to development.

Apparatus, materials and techniques have been devised for facilitating the development of strip film without requiring that the film be immersed in one or more tanks of liquid. One such technique utilizes carrier webs saturated with a chemical monobath brought into intimate contact with the exposed film emulsion and separated after the desired processing period. The process is clean, rapid and convenient, particularly for in situ development, but the quality of the finished film can be degraded due to failure to achieve intimate contact between the web and the film, due to scratching of the film. Also, the mechanism can be complex and costly.

Accordingly, principal objects of the present invention are to provide a new and improved apparatus for the processing of strip film using chemical saturated webs whereby intimate contact is maintained between the web and the film and mechanical abrasion of the film is precluded. Another object of the invention is to provide film processing apparatus which can be integrated with camera means for exposing the film and means for viewing or projecting the film immediately after it is developed.

In accordance with the present invention there is provided a housing carrying an array of four reels and a web saturated with developer and fixer chemicals. The housing is pierced by an aperture adjacent the unexposed film storage reel by means of which the film can, if desired, be exposed to light images controlled by suitable lens and shutter assemblies to function as a camera. An elongated arcuate platen, preferably having a relatively large radius of curvature, is nested among the reels and the film and web are passed over the convex curvature of the platen with the film preferably superimposed on the web so that the web rides directly upon the platen surface. Suitable guide means such as rollers guide the film into intimate engagement at the leading edge of the platen and suitable pressure means such as a pad or roller presses the film against the web. At the discharge end of the platen the film and web are separated with the web going to a power-driven takeup reel and the film passing through an optical viewing head to a drive sprocket to a film takeup reel. In one preferred arrangement of the invention the web supply and takeup reels are located closely adjacent the platen on the concave side and the film storage and takeup reels are located closely adjacent the platen on the convex side.

The optical viewing mechanism, which can take the form of a housing carrying an internal illuminating source, viewing lenses and suitable film guide means, is pivotally mounted to the housing of the processor about an axis which passes closely adjacent the point of separtion of the web and the film as they emerge from the platen.

Figure 2:
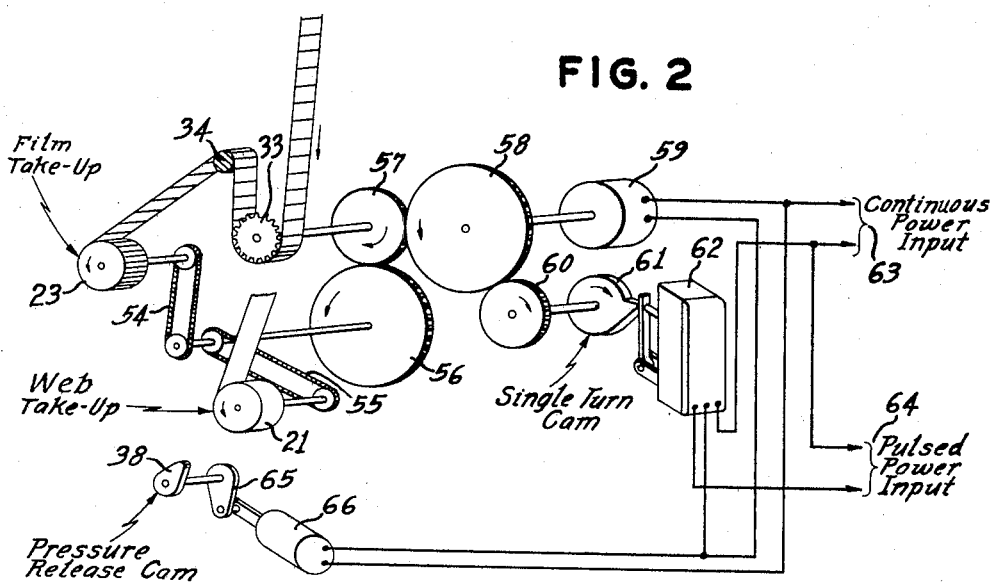
Figure 3:
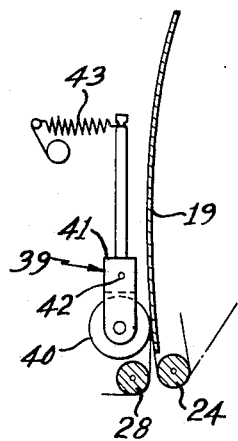

The above and other features and advantages of the present invention will be readily understood, having reference to the accompanying drawings illustrating preferred embodiments thereof and in which, FIG. 1 is a view in vertical section of a film processing apparatus including an optical viewing assembly for the processed film and camera mechanism for exposing the film;

FIG. 2 is a schematic view of the drive and timing mechanism for the apparatus of FIG. 1; and FIG. 3 is a fragmentary view illustrating a second preferred arrangement for effecting intimate contact between the film processing web and the film within the apparatus of FIG. 1.

Referring to FIG. 1, the invention is illustrated embodied in a film processing, viewing and camera apparatus illustrated generally by the numeral 10, including a light-tight housing 11 for most of the film processing portion of the apparatus, an optical viewing head 12 for scanning the processed film, and camera mechanism shown partly in phantom lines and illustrated generally by the numeral 13. The camera portion includes an aperture 14 adjacent the focal plane 14a over which the film passes to be exposed. In the illustrated system, the image source includes an oscilloscope and reflector or prism 15, shown in phantom lines. In the event the camera portion of the system is not used the aperture 14 is closed by means of a closure plate 16.

The film processing section 11 of the apparatus includes a light-tight housing portion 17 furnished with suitable access doors (not shown), and, at its upper end, a discharge opening 18 for the developed film. Mounted within the housing 17 and aligned generally with the major axis thereof is an arcuate platen 19 having a relatively large radius of curvature. On the concave or inner side of the platen 19 are storage and takeup reels 20 and 21, respectively, for a web saturated with film developing chemicals. On the concave side of the platen 19 are mounted a pair of film storage and takeup reels 22 and 23, respectively, of which the storage reel is mounted within the light-tight housing 17 and the takeup reel is mounted externally for convenient access. The web W is passed from the supply reel 20 to the input end of the platen 19 by guide means which can take the form of a roller 24 arranged so that the platen surface, if extended, would be substantially tangent thereto. The web passing from the output end of the platen is received by guide means such as a roller 25, also substantially tangent to the platen if extended and from which it passes over a second guide roller 26 to the takeup reel 21. It will be observed that the web supply and takeup reels are nested within the space defined by the platen and the inner wall of the housing.

The strip film F is conveyed from the supply reel 22 by means of guides 27 and 28 to the input end of the platen 19, the guide 28 preferably taking the form of a roller which is substantially tangent to the arcuate platen slightly beyond the input end thereof. Thus a slight angle exists between the film F and the web W. The film engages the web in precisely aligned relationship therewith and, passing from the output end of the platen, is positioned by a guide roller 29 located so that its surface is substantially tangent to the projected line of the platen surface. The guides 29 and 25 are so located that the film and web part at a slight angle. Leaving the guide 29 the film is passed into the viewing head 12, described below, through which it is guided by rollers 30, 31 and 32 to a drive sprocket 33 on the housing 17, to a guide roller 34, to the takeup reel 23.

In its path of travel from the supply reel 22 to the takeup reel 23 the film passes the aperture 14 which, when the apparatus is used as a camera, has images focused thereon by means, such for example, as the oscilloscope and reflector 15 and the camera lens and shutter assembly 13. The emulsion side of the film is exposed to the image and scattered light is blocked from entering the housing by an opaque plate 35. The web and film pass about the guide rollers 24 and 28, respectively, and meet on the concave outer surface of the platen near its input end and, being under tension as a result of drive means at the takeup reel 21 and the sprocket 33, remain in overlapping relationship snugly against the arcuate platen throughout substantially its entire length.

Disposed at the input end of the platen 19 is a pressure member 36 pivoted to the housing frame at 36a and resiliently urged by the adjustable spring means 37 toward the platen 19. The controlled pressure of the working face of the pressure member 36 eliminates residual air pockets between the mated web and film. The pressure member of FIG. 1 is periodically urged away from the platen by a pressure release cam 38 driven in timed relationship to the step advance of the film frame by means described below having reference to FIG. 2.

Referring to FIG. 3 an alternative pressure member 39 is shown which remains in continuous contact with the film and is useful in systems in which the film is moved either stepwise for frame pictures or continuously as might be required for example in a developing process operated independently of step by step camera functions. To this end the pressure member 39 includes a pressure roller 40 carried by a yoke 41 pivoted to the housing at 42 and resiliently biased toward the platen 19 by an adjustable spring 43. It will be observed that the cam lifter 38 of FIG. 1 is not utilized in the arrangement of FIG. 3.

Referring again to FIG. 1, the viewing head 12 comprises a tubular shell or housing 44 carrying viewing lenses 45 and 46, a diffuser 47 having filters as required, a light source 48 and a reflector 48a. The viewing head is supported by a frame piece 49 formed at its lower end with a transverse semi-cylindrical bore or opening 50 by means of which the unit is mounted on a cylindrical bearing 51 formed at the upper end of the housing 11. The film discharge opening 18 in the bearing 51 is completely eclipsed by the frame piece 49 which is free to pivot on the bearing 51 over a range of angles as illustrated in phantom lines. Thus the frame piece 49 seals at film opening 18 against external light. The film passes from the opening 18 into the viewing head through a narrow slot 52 and then between the diffuser 47 and the lens 46 and through a slot 53 at the upper end of the housing 44. The small amounts of light which might enter the processing assembly through the lower slot 52 is blocked by the guide rollers 25 and 29 as well as the adjacent limbs at the processed film and the expired web. This shielding, coupled with the shielding effect of the platen 19 and the location of the film supply spool 22 effectively prevents fogging of the film between the supply reel 22 and the input end of the platen 19.

It will be observed that the viewing head 12 pivots about an axis which is disposed between closely spaced guide rollers 25 and 29 within the cylindrical bearing 51, thus the limb of processed film passing from the guide roller 29 into the viewing head 12 simply changes its tangent line on the guide roller 29 as the viewing head is cocked through its range of viewing angles.

Referring to FIG. 2, the drive and control system for the film processor is illustrated. The film and web takeup reels 23 and 21 are driven by means of slip springs 54 and 55, respectively, through a gear train including gears 56, 57 and 58, the latter being driven by a motor 59. The gear 57 has a shaft coupled to the sprocket 33 for positive drive and the gear 58 is meshed with a gear 60, the shaft of which drives a timer cam 61 which engages a double pole switch 62.

The motor 59 is adapted to be energized from either of two sets of power source terminals 63 or 64. Source terminals 63 comprise a continuous power input and terminals 64 comprise a pulsed power input 64 for programming the operation. The double pole switch 62 is so arranged that when the cam 61 is in the position illustrated in FIG. 3 the continuous power circuit from terminals 63 is open and the pulsed power circuit to the motor is closed or conditioned for operation. A pulsed input signal at the terminal 64 will drive the motor 59 causing the cam 61 to actuate the switch 62 to connect the continuous power source 63 directly to the motor 59. The motor will continue to run until the cam 61 has made a complete rotation, at which time the continuous power source will be cut off and the pulse power input will be conditioned to drive the motor upon receipt of the next input pulse. In this fashion the film and web are driven forward step by step and the timing functions are so arranged that the film is fully processed over the period it is in engagement with the web. The intervals between stepping motions provide for action of the camera shutter and for optical viewing of the developed film. In order to release the pressure member 36 from the film during film and web motion, the pressure release cam 38 is coupled through a crank 65 to a solenoid 66 which is connected across both sets of terminals 63 and 64 so that energization of the motor from any source will release the pressure member. Switch means (not shown) is provided for effecting continuous film and web advance from the power terminals 63.

While the invention has been described above having reference to preferred embodiments thereof it will be understood that it can take various forms and arrangements. Thus, for example, if it is desired to reduce the processing time the platen 19 can be heated. Also, it is preferred that the platen be smooth and slippery and to this end it can be Teflon coated. Various other drive and timing arrangements can be provided to achieve other desired interaction with camera or viewing mechanisms and the location of the camera exposure opening 14 and the viewing head 12 can be arranged to suit particular requirements. In the event the device is to be used as film processor only, the camera aperture can be closed by a cover piece 16. The invention should not therefore be regarded as limited except as defined in the following claims.

I claim:

1. Apparatus for processing strip film comprising, film supply and takeup reels, a web supply reel for a web previously treated with film developing chemical, a web takeup reel for the same, an arcuate convex platen of large radius, guide means to merge the web and film and to pass the web and film as one in aligned overlying relationship over the length of said platen on the convex side thereof in an arcuate configuration conformal thereto, a movable pressure means, resilient means to urge the pressure means toward the platen to press the film and web into intimate contact with each other and with the platen, and drive means to advance the web and film in the same direction and at substantially the same speed from the respective supply means to the respective takeup means.

2. Apparatus as defined in claim 1, in which there is an aperture receiving a camera head at a point between the film supply reel and the platen, and in which there is a processed film viewing head receiving the film at a point between the platen and the film takeup reel.

3. Apparatus for processing strip film comprising, film supply and takeup reels, web supply and takeup reels for a web previously treated with film developing chemical, an arcuate convex platen, guide means to merge the web and film and to pass the web and film as one in aligned overlying relationship over the length of said platen on the convex side thereof in an arcuate configuration conformal thereto, a pressure means, resilient means to urge the film and web into intimate contact with each other and with the platen, drive means to intermittently advance the web and film from the respective supply means to the respective takeup means, pressure release means to periodically release the pressure means from the film, web and platen, and means responsive to said drive means for the web and film to actuate the pressure release means during advance of the web and film.

4. Apparatus as defined in claim 3, in which there is an aperture receiving a camera head at a point between the film supply reel and the platen, and in which there is a processed film viewing head receiving the film at a point between the platen and the film takeup reel.

5. Apparatus for processing strip film comprising, film supply and takeup reels, web supply and takeup reels for a web previously treated with film developing chemical, an arcuate convex platen, guide means to merge the web and film and to pass the web and film in aligned overlying relationship over the length of said platen on the convex side thereof in an arcuate configuration conformal thereto, drive means to advance the web and film from the respective supply means to the respective takeup means, a substantially light-tight housing for said film supply means and platen, film and web guide means in the housing adjacent the discharge end of the platen to separate the web and film, said guide means comprising a pair of closely spaced rollers over which the film and web respectively pass substantially tangentially to the platen, a processed film viewing head adjacent said rollers, and means to pivotally mount the viewing head on the housing for pivotal movement about an axis passing generally parallel to and between the closely spaced rollers, so that the viewing head may be tilted without substantially changing the tangential relation of the film and web to the platen.

6. Apparatus as defined in claim 5, in which there is an aperture receiving a camera head at a point between the film supply reel and the platen.

7. Apparatus for processing strip film comprising, film supply and takeup reels, web supply and takeup reels for a web previously treated with film developing chemical, an arcuate convex platen of large radius, guide means to merge the web and film and to pass the web and film as one in aligned overlying relationship over the length of said platen on the convex side thereof in an arcuate configuration conformal thereto, drive means to advance the web and film in the same direction and at substantially the same speed from the respective supply means to the respective takeup means, a substantially light-tight housing for said film supply means and platen, film and web discharge guide means in the housing adjacent the discharge end of the platen to separate the web and film, said discharge guide means comprising a pair of closely spaced rollers over which the film and web respectively pass substantially tangentially to the platen, a processed film viewing head adjacent said rollers, means to pivotally mount the viewing head on the housing for pivotal movement about an axis passing generally parallel to and between the closely spaced rollers, said means to mount the viewing head comprising a cylindrical bearing on said housing enveloping said rollers and having a relatively wide film discharge opening therein, and a cylindrical socket on said viewing head disposed around said opening and having a narrow slot for film passage, whereby the head is tiltable on the housing with the light from the viewing head being shielded from the housing by the narrow slot and by the rollers within the cylindrical bearing.

8. Apparatus as defined in claim 7, in which there is an aperture receiving a camera head at a point between the film supply reel and the platen.

References Cited by the Examiner
UNITED STATES PATENTS

| | | | |
|---|---|---|---|
| 2,797,625 | 7/1957 | Fairbanks | 95—13 |
| 2,854,903 | 10/1958 | Land | 95—12 X |
| 2,930,302 | 3/1960 | Tuttle | 95—14 |
| 2,971,445 | 2/1961 | Orlando | 95—13 |

JOHN M. HORAN, *Primary Examiner.*